May 19, 1925.
R. RASMUSSEN
1,538,653
FENDER BRACE
Filed Dec. 10, 1923
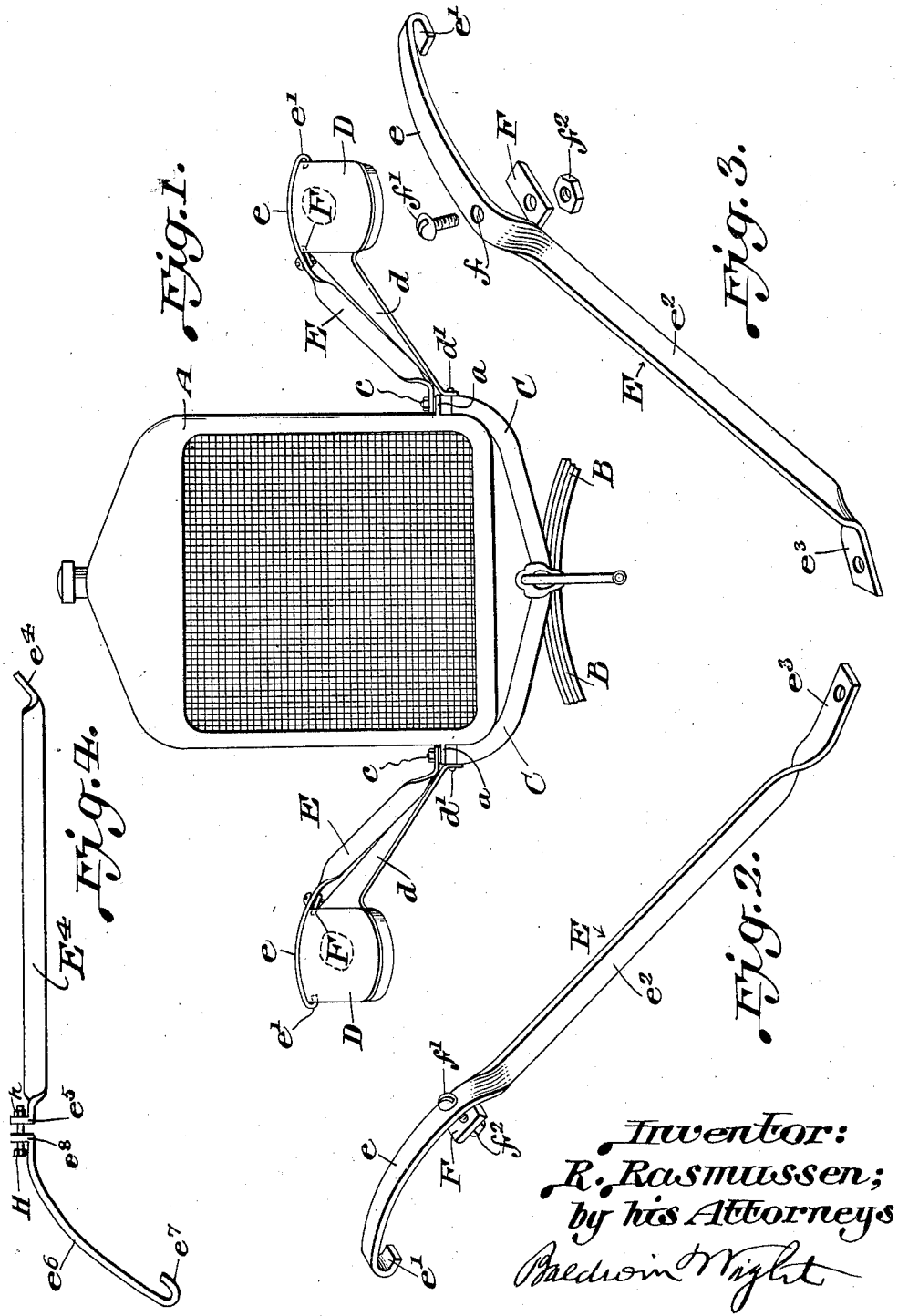
Inventor:
R. Rasmussen;
by his Attorneys
Baldwin Wight Patented May 19, 1925.

1,538,653

UNITED STATES PATENT OFFICE.

RASMUS RASMUSSEN, OF PONTIAC, ILLINOIS.

FENDER BRACE.

Application filed December 10, 1923. Serial No. 679,707.

*To all whom it may concern:*

Be it known that I, RASMUS RASMUSSEN, a citizen of the United States, residing at Pontiac, in the county of Livingston and State of Illinois, have invented certain new and useful Improvements in Fender Braces, of which the following is a specification.

This invention relates to motor cars in which fenders or mud guards are employed to partially cover the wheels. Ordinarily these fenders are held above the wheels by supports which extend to the vehicle frame or chassis, but usually the fender supports are insufficient to prevent the fenders from sagging, working loose, vibrating unduly or rattling.

The object of my invention is to so brace the fenders that they shall be held firmly in place in such manner as to overcome the difficulties heretofore encountered.

In carrying out my invention I provide for each fender a brace comprising a stout metal bar having an outer portion which extends over the fender and is formed with a hook which engages the outer edge of the fender, its inner end being formed with a perforated foot, adapting it to be secured to the vehicle frame.

The brace bar carries a clamp member which is adapted to engage the inner edge of the top portion of the fender in such manner as to firmly hold the braces on the fender when fastened thereto. A separate brace is used for each fender and each brace is made from a single piece of metal carrying a single adjustable clamp.

My improvements are illustrated in the accompanying drawings, in which—

Figure 1 is a front elevation of an automobile radiator and a part of the frame of the vehicle, showing also parts of the two front fenders with my improved braces applied thereto.

Figure 2 is a perspective view of the preferred form of brace.

Figure 3 is a perspective view of a modification.

Figure 4 shows a further modification.

I have shown my improvements applied to a type of automobile of well known construction.

A radiator is indicated at A and parts of the front spring and frame are indicated at B and C. The radiator frame is formed with lugs $a$ which are secured to the chassis frame C by bolts $c$. The fenders D are of a well known kind, the skirt or curtain $d$ being inclined downwardly from the fender proper and bolted to the vehicle frame at $d'$.

Each brace E is made from a single piece of stout, flat bar iron or other suitable metal, bent to the shape indicated in the drawings to provide a curved outer part $e$ which fits over the top of the fender, a hook $e'$ adapted to engage the outer edge of the fender, and an inclined brace member $e^2$ and a foot $e^3$ adapted to connect with the frame of the radiator or with the chassis.

The braces E, shown in Figures 2 and 3, are of the same construction except that in Figure 3 the foot portion $e^3$ is slightly different.

Each brace carries a clamp member F adapted to engage the inner edge of the fender. This member consists of a short piece of metal perforated at $f$ nearer to one end than the other and which is connected to the part $e$ of the brace by a bolt $f'$ carrying a nut $f^2$.

Braces constructed as shown and in the manner above described may be made very cheaply and may be very easily applied to or detached from the machine. The hook $e'$ may be first engaged with the outer edge of the fender and the part $e$ made to lie close to the top thereof; then the clamp F may be applied to the inner edge of the fender and the nut $f^2$ tightened. Then the foot $e^3$ may be fastened to the radiator lug $a$ or to some other part of the frame. It will be observed that as shown in the drawings the same bolt $c$ which attaches the radiator to the chassis is employed to attach the brace thereto. The braces and their clamping members may be applied in other ways than those above described. For instance, the feet of the braces may be first attached and then the other parts secured in an obvious way.

When the braces are thus applied the fenders are held firmly in place, sagging thereof is avoided and undue vibration or rattling is prevented. If one fender should by some accident become displaced the other fender or other fenders are not necessarily thus affected as the braces are entirely independent of each other.

In Figure 4 a modification is shown in which the outer part of the brace is made separately and is adjustably connected to the inner part. As shown, the member $E^4$ is formed with a foot $e^4$ similar to the foot $e^3$ and it is formed at its outer end with an arm $e^5$. The outer member $e^6$ is formed with a hook $e^7$ and with an arm $e^8$. A headed bolt H, carrying a nut $h$, is employed for connecting the two arms. In this way the brace, as a whole, may be made adjustable to suit different conditions and may be tightly applied to the fender.

I claim as my invention:—

In a vehicle having the usual frame, wheel fenders, and a radiator secured to the vehicle frame by bolts, a fender brace comprising an outer part extending over the top of the fender formed with a hooked outer end engaging the outer end of the fender, a foot portion secured to the vehicle frame by one of the bolts which secures the radiator thereto, and a clamp member carried by the upper part of the brace and engaging the inner edge of the fender.

In testimony whereof I have hereunto subscribed my name.

RASMUS RASMUSSEN.